(12) United States Patent
Picron et al.

(10) Patent No.: US 12,469,305 B2
(45) Date of Patent: Nov. 11, 2025

(54) OBJECT DETECTION WITH IMAGES

(71) Applicant: Ford Global Technologies, LLC, Dearborn, MI (US)

(72) Inventors: Cédric Picron, Meise (BE); Tinne Tuytelaars, Korbeek-Lo (BE); Punarjay Chakravarty, Campbell, CA (US); Shubham Shrivastava, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 17/932,021

(22) Filed: Sep. 14, 2022

(65) Prior Publication Data
US 2024/0087332 A1    Mar. 14, 2024

(51) Int. Cl.
*G06V 20/58* (2022.01)
*B60W 60/00* (2020.01)
(Continued)

(52) U.S. Cl.
CPC .......... *G06V 20/58* (2022.01); *B60W 60/001* (2020.02); *G06V 10/25* (2022.01); *G06V 10/764* (2022.01);
(Continued)

(58) Field of Classification Search
CPC .... G06V 20/58; G06V 10/25; G06V 10/7715; G06V 10/82; G06V 10/764; B60W 60/001; B60W 2554/402; B60W 2420/403
See application file for complete search history.

(56) References Cited

U.S. PATENT DOCUMENTS 10,713,794 B1    7/2020    He et al.
11,017,556 B2    5/2021    Yang et al.
(Continued)

FOREIGN PATENT DOCUMENTS

WO    WO-2021175434 A1  *  9/2021    ....... G06F 18/24137

OTHER PUBLICATIONS

Lin, T. et al., "Microsoft COCO: Common Objects in Context," arXiv:1405.0312v3 [cs.CV], Feb. 21, 2015, 15 pages.
(Continued)

*Primary Examiner* — Matthew C Bella
*Assistant Examiner* — Jinsu Hwang
(74) *Attorney, Agent, or Firm* — Frank A. MacKenzie; Brooks Kushman P.C.

(57) ABSTRACT

A computer is programmed to receive image data from a sensor; generate a feature pyramid from the image data, the feature pyramid including a plurality of features; apply a plurality of preliminary bounding boxes to the features to generate a plurality of preliminarily bounded features, each preliminarily bounded feature being a pairing of one of the preliminary bounding boxes and one of the features; execute a machine-learning program on the preliminarily bounded features to determine a plurality of classifications and a respective plurality of predicted bounding boxes; and actuate a component of a machine, e.g., a vehicle, based on the classifications and the predicted bounding boxes. The machine-learning program is a two-stage object detector having a first stage and a second stage. The first stage selects a subset of the preliminarily bounded features to pass to the second stage.

17 Claims, 3 Drawing Sheets

(51) Int. Cl.
*G06V 10/25* (2022.01)
*G06V 10/764* (2022.01)
*G06V 10/77* (2022.01)
*G06V 10/82* (2022.01)

(52) U.S. Cl.
CPC .......... *G06V 10/7715* (2022.01); *G06V 10/82* (2022.01); *B60W 2420/403* (2013.01); *B60W 2554/402* (2020.02)

(56) References Cited

U.S. PATENT DOCUMENTS

| | | | |
|---|---|---|---|
| 11,023,767 B2 | 6/2021 | Sarshogh et al. | |
| 11,176,384 B1* | 11/2021 | Yang | H04N 23/54 |
| 2021/0026355 A1* | 1/2021 | Chen | G01S 17/89 |
| 2021/0158043 A1* | 5/2021 | Hou | G06V 10/454 |

OTHER PUBLICATIONS

Lin. T. et al., "Feature Pyramid Networks for Object Detection," arXiv:1612.03144v2 [cs.CV], Apr. 19, 2017, 10 pages.
Lin. T. et al., "Focal Loss for Dense Object Detection." arXiv:1708.02002v2 [cs.CV], Feb. 7, 2018, 10 pages.
Zhu, et al., "Deformable DETR: Deformable Transformers for End-To-End Object Detection," arXiv:2010.04159v4 [cs.CV], Mar. 18, 2021, 16 pages.
Ren, S. et al., "Faster R-CNN: Towards Real-Time Object Detection with Region Proposal Networks," arXiv:1506.01497v3 [cs.CV], Jan. 6, 2016, 14 pages.
Vaswani, S. et al., "Attention Is All You Need," 31st Conference on Neural Information Processing Systems, 2017, 11 pages.
Carion, N., et al., "End-to-End Object Detection with Transformers," arXiv:2005.12872v3 [cs.CV], May 28, 2020, 26 pages.

* cited by examiner

OBJECT DETECTION WITH IMAGES

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more sensors that can be processed to determine data regarding objects in the system's environment. Data regarding objects in the environment can be combined with data regarding location of a system by a computer and used to operate systems including vehicles, robots, security systems, and/or object tracking systems.

DETAILED DESCRIPTION

Figure 1:
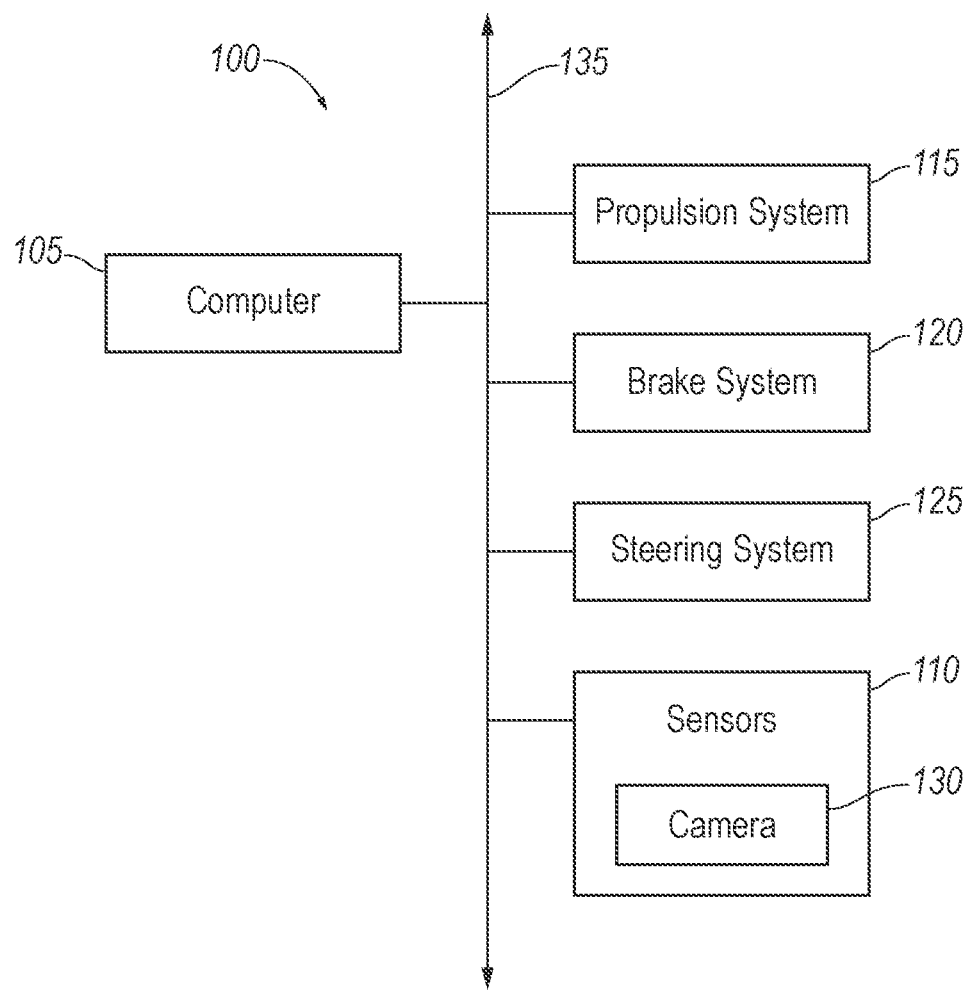
FIG. 1 is a block diagram of an example vehicle.

This disclosure details techniques for detecting objects in image data for actuating a machine, for example, a vehicle. Vehicle operation is used herein as an example of a system that acquires sensor data regarding objects in the vehicle's environment, processes the sensor data, and operates the vehicle based on the processed sensor data. However, techniques described herein can be applied to other systems such as robots, security systems or object tracking systems that detect objects as a basis for actuating a machine, e.g., for moving a robot arm, closing or locking a door, etc. A computer on board the vehicle is programmed to receive the image data from a sensor of the vehicle and generate a feature pyramid from the image data. The feature pyramid can be a set of feature maps having different dimensions and includes a plurality of features. Next, the computer applies a plurality of preliminary bounding boxes to the features to generate a plurality of preliminarily bounded features. The preliminary bounding boxes serve as attempts to circumscribe the features. The preliminary bounding boxes can be a variety of sizes and aspect ratios, and more than one preliminary bounding box can be applied to a given feature, meaning that a given feature can be included in more than one preliminarily bounded feature. Each preliminarily bounded feature is a pairing of one feature and one respective preliminary bounding box. Next, the computer executes a machine-learning program on the preliminarily bounded features to determine a plurality of classifications and a respective plurality of predicted bounding boxes. Finally, the computer actuates a component of the vehicle based on the classifications and the predicted bounding boxes.

The machine-learning program is a two-stage object detector having a first stage and a second stage. The first stage is programmed to select a subset of the preliminarily bounded features, and the second stage is programmed to determine the classifications of the features of the selected preliminarily bounded features and determine the predicted bounding boxes for the selected preliminarily bounded features. The machine-learning program offers high accuracy in terms of identifying and locating objects for the vehicle to act on. The accuracy is helped by the use of feature pyramids, facilitating detection of objects at a range of sizes in the image data. Moreover, the machine-learning program has a fast convergence when training.

A computer includes a processor and a memory, and the memory stores instructions executable by the processor to receive image data from a sensor; generate a feature pyramid from the image data, the feature pyramid including a plurality of features; apply a plurality of preliminary bounding boxes to the features to generate a plurality of preliminarily bounded features, each preliminarily bounded feature being a pairing of one of the preliminary bounding boxes and one of the features; execute a machine-learning program on the preliminarily bounded features to determine a plurality of classifications and a respective plurality of predicted bounding boxes; and actuate a machine component of based on the classifications and the predicted bounding boxes. The machine-learning program is a two-stage object detector having a first stage and a second stage. The first stage is programmed to select a subset of the preliminarily bounded features. The second stage is programmed to determine the classifications of the features of the selected preliminarily bounded features and determine the predicted bounding boxes for the selected preliminarily bounded features.

The machine component may include at least one of a propulsion system, a brake system, or a steering system of a vehicle.

The preliminary bounding boxes may have a plurality of different pixel areas.

The preliminary bounding boxes may have a plurality of aspect ratios. The preliminary bounding boxes may have a plurality of different pixel areas, the second stage may be further programmed to scale the selected preliminarily bounded features to a uniform size, and scaling each selected preliminarily bounded feature to the uniform size may include selecting one of a plurality of transition networks according to the pixel area and aspect ratio of the preliminarily bounded feature and applying the selected transition network to the preliminarily bounded feature.

The second stage may be further programmed to, before determining the classifications and the predicted bounding boxes, scale the selected preliminarily bounded features to a uniform size.

The second stage may be further programmed to, before determining the classifications and the predicted bounding boxes, apply a plurality of decoder transformer layers to the selected preliminarily bounded features. Each decoder transformer layer may include a cross-attention operation that, for a given one of the selected preliminarily bounded features, pools data about the features that neighbor the feature of the given one of the preliminarily bounded features in the feature pyramid. The cross-attention operation may receive the feature pyramid as an input.

The cross-attention operation may be a multiscale deformable operation.

Each decoder transformer layer may include a self-attention operation that, for a given one of the selected preliminarily bounded features, interacts the given one of the selected preliminarily bounded features with others of the selected preliminarily bounded features.

Each decoder transformer layer may include a feedforward operation.

Selecting the subset of the preliminarily bounded features may include executing a convolutional neural network including at least one hidden layer. The hidden layer may include a bottleneck layer.

Determining the classifications may include selecting the classifications from a plurality of prestored classifications.

The prestored classifications may include a nonobject classification indicating that the classified feature is not from an object.

The prestored classifications may include at least one vehicle classification indicating that the classified feature is from a vehicle and at least one pedestrian classification indicating that the classified feature is from a pedestrian.

Determining the classifications may include executing a regression network.

Determining the predicted bounding boxes may include executing a regression network.

A method includes receiving image data from a sensor; generating a feature pyramid from the image data, the feature pyramid including a plurality of features; applying a plurality of preliminary bounding boxes to the features to generate a plurality of preliminarily bounded features, each preliminarily bounded feature being a pairing of one of the preliminary bounding boxes and one of the features; executing a machine-learning program on the preliminarily bounded features to determine a plurality of classifications and a respective plurality of predicted bounding boxes; and actuating a machine component based on the classifications and the predicted bounding boxes. The machine-learning program is a two-stage object detector having a first stage and a second stage. The first stage is programmed to select a subset of the preliminarily bounded features. The second stage is programmed to determine the classifications of the features of the selected preliminarily bounded features and determine the predicted bounding boxes for the selected preliminarily bounded features.

With reference to the Figures, wherein like numerals indicate like parts throughout the several views, a computer 105 includes a processor and a memory, and the memory stores instructions executable by the processor to receive image data 200 from a sensor 110 of a vehicle 100; generate a feature pyramid 205 from the image data 200, the feature pyramid 205 including a plurality of features; apply a plurality of preliminary bounding boxes 210 to the features to generate a plurality of preliminarily bounded features 215, each preliminarily bounded feature 215 being a pairing of one of the preliminary bounding boxes 210 and one of the features; execute a machine-learning program 220 on the preliminarily bounded features 215 to determine a plurality of classifications 225 and a respective plurality of predicted bounding boxes 230; and actuate a machine component of the vehicle 100 based on the classifications 225 and the predicted bounding boxes 230. The machine-learning program 220 is a two-stage object detector having a first stage 235 and a second stage 240. The first stage 235 is programmed to select a subset of the preliminarily bounded features 215. The second stage 240 is programmed to determine the classifications 225 of the features of the selected preliminarily bounded features 255 and determine the predicted bounding boxes 230 for the selected preliminarily bounded features 255.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 105 can be programmed to operate the vehicle 100 independently of the intervention of a human operator, completely or to a lesser degree. The computer 105 may be programmed to operate a propulsion system 115, a brake system 120, a steering system 125, and/or other vehicle 100 systems based at least in part on the image data 200 from the sensor 110. For the purposes of this disclosure, autonomous operation means the computer 105 controls the propulsion system 115, brake system 120, and steering system 125 without input from a human operator; semi-autonomous operation means the computer 105 controls one or two of the propulsion system 115, brake system 120, and steering system 125 and a human operator controls the remainder; and nonautonomous operation means a human operator controls the propulsion system 115, brake system 120, and steering system 125.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 135 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the propulsion system 115, the brake system 120, the steering system 125, the sensors 110, and other components via the communications network 135.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

The sensors 110 may provide data about operation of the vehicle 100, for example, wheel speed, wheel orientation, and engine and transmission data (e.g., temperature, fuel consumption, etc.). The sensors 110 may detect the location and/or orientation of the vehicle 100. For example, the sensors 110 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 110 may detect the external world, e.g., objects and/or characteristics of surroundings of the vehicle 100, such as other vehicles, road lane markings, traffic lights and/or signs, pedestrians, etc. For example, the sensors 110 may include radar sensors, ultrasonic sensors, scanning laser range finders, light detection and ranging (lidar) devices, and image processing sensors such as cameras 130.

In particular, the sensors 110 may include at least one camera 130. The camera 130 can detect electromagnetic radiation in some range of wavelengths. For example, the camera 130 may detect visible light, infrared radiation, ultraviolet light, or some range of wavelengths including visible, infrared, and/or ultraviolet light. For example, the camera 130 can be a charge-coupled device (CCD), complementary metal oxide semiconductor (CMOS), or any other suitable type.

Figure 2:
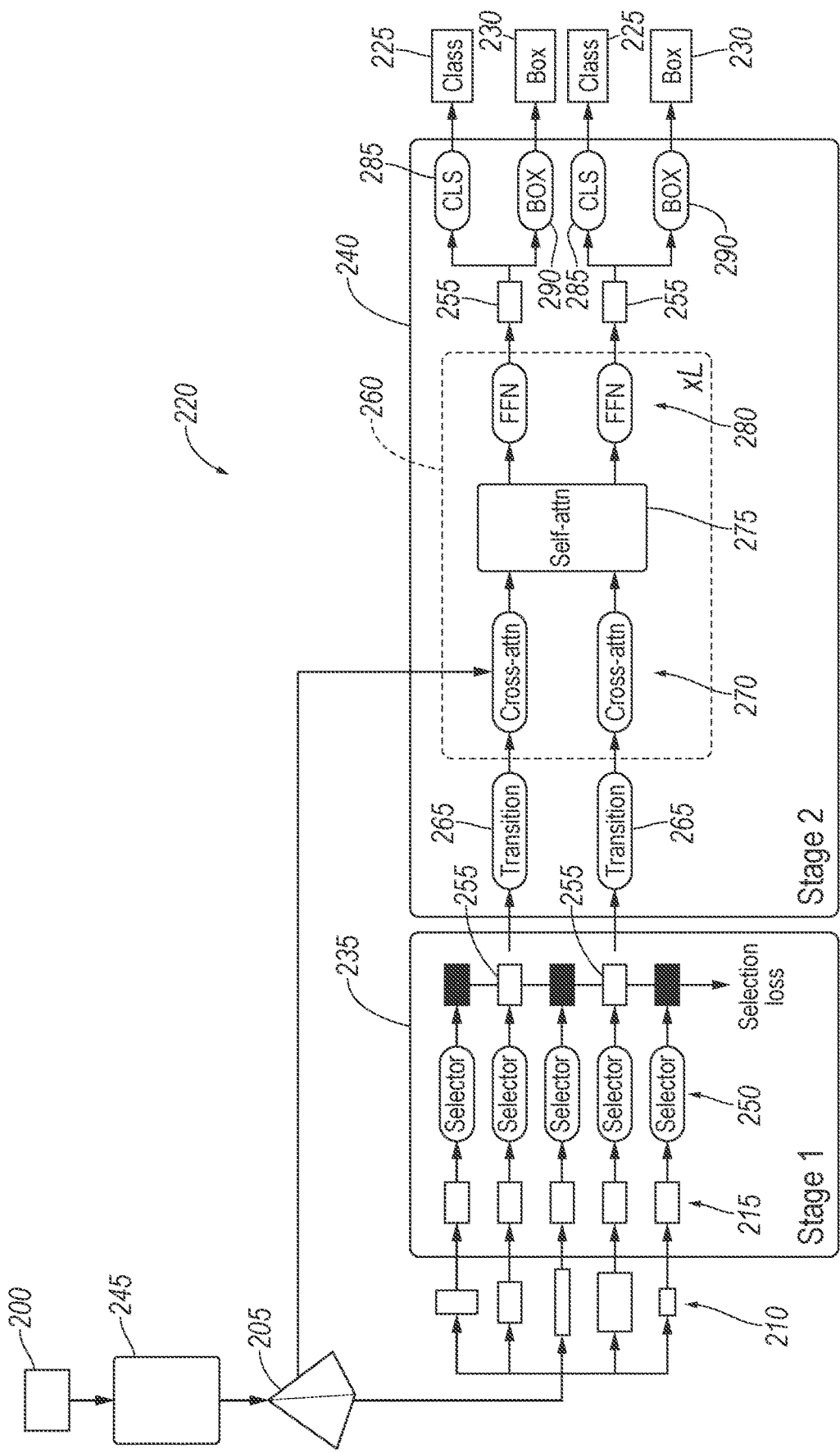
FIG. 2 is a diagram of a machine-learning program for detecting objects by a computer of the vehicle.

With reference to FIG. 2, one of the sensors 110, e.g., the camera 130, generates the image data 200 that is received by the computer 105. The image data 200 are a sequence of image frames of the field of view of the sensor 110. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor 110 at the time that the image frame was recorded, can be specified in pixel dimensions or coordinates, e.g., an ordered pair of pixel distances, such as a number of pixels from a top edge and a number of pixels from a left edge of the image frame.

The image data 200 is used to generate the feature pyramid 205. The feature pyramid 205 includes a plurality of features. For this disclosure, the term "feature" is used in its computer-vision sense as a piece of information about the content of an image, specifically about whether a certain region of the image has certain properties. Types of features may include edges, corners, blobs, etc. For example, the feature pyramid 205 may include a plurality of feature maps. A feature map provides locations in an image frame, e.g., in pixel coordinates, of the features. A feature map has a reduced dimensionality, i.e., resolution, compared to the image frame. The feature maps of a given feature pyramid 205 may have varied dimensionalities. For example, each feature map of a given feature pyramid 205 may be downscaled by a different factor from the image frame, e.g., downscaled a different number of times by a factor of 2, e.g., five feature maps ranging from downscaled by a factor of 2 three times to downscaled by a factor of 2 seven times.

The computer 105 is programmed to generate the feature pyramid 205 from the image data 200, e.g., from an image frame of the image data 200. Generating the feature pyramid 205 includes executing a feature extractor 245. The feature extractor 245 may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The feature extractor 245 may include machine-learning operations. For example, the feature extractor 245 may include residual network (ResNet) layers followed by a convolutional neural network such as a trident pyramid network, which is useful for generating the feature pyramids 205 having differently sized feature maps.

The feature extractor 245 may be trained separately from the machine-learning program 220. The feature extractor 245 may be trained on publicly available image sets. All or a portion of the feature extractor 245 may be pretrained, i.e., taken from an off-the-shelf program.

The preliminary bounding boxes 210 are attempts to circumscribe the features in the image frame. Each preliminary bounding box 210 can be defined by, e.g., pixel coordinates of opposite corners of the preliminary bounding box 210, or pixel coordinates of a center of the preliminary bounding box 210 combined with width and height in pixels. The preliminary bounding boxes 210 may have a plurality of different sizes, e.g., different pixel areas and/or different aspect ratios. The sizes can be chosen so that at least one size will be sufficiently close for a bounding-box regression network 290 (described below) to determine a tightly fitted predicted bounding box 230. For example, the preliminary bounding boxes 210 may include three aspect ratios and three pixel areas for each aspect ratio, for a total of nine sizes.

The computer 105 is programmed to apply the preliminary bounding boxes 210 to the features to generate the preliminarily bounded features 215. Each preliminarily bounded feature 215 is a pairing of one of the preliminary bounding boxes 210 and one of the features. Thus, for each feature, there will be a number of preliminarily bounded features 215 equal to the number of sizes of the preliminary bounding boxes 210. The computer 105 may apply the preliminary bounding box 210 by determining a center point of the feature and centering the preliminary bounding box 210 on the center point.

The computer 105 is programmed to execute the machine-learning program 220 on the preliminarily bounded features 215 to determine the classifications 225 and the respective predicted bounding boxes 230. In other words, the input to the machine-learning program 220 is the preliminarily bounded features 215, and the output of the machine-learning program 220 is the classifications 225 and the respective predicted bounding boxes 230. The classifications 225 and the predicted bounding boxes 230 are for a subset of the preliminarily bounded features 215, saving processing time and focusing the actuation of the vehicle 100 on the comparatively more important features.

The machine-learning program 220 is a two-stage object detector having the first stage 235 and the second stage 240. The first stage 235 selects the subset of the preliminarily bounded features 215. The preliminarily bounded features 215 in the subset are referred to as the selected preliminarily bounded features 255. The second stage 240 determines the classifications 225 of the features of the selected preliminarily bounded features 255 and determines the predicted bounding boxes 230 for the selected preliminarily bounded features 255. In other words, for each preliminarily bounded feature 215 selected by the first stage 235, the second stage 240 outputs one classification 225 of the feature and one predicted bounding box 230.

The first stage 235 is programmed to select the subset of the preliminarily bounded features 215. The selection may be based on characteristics of the features that indicate importance and/or based on the accuracies of the preliminary bounding boxes 210 fitting the features. The subset may include a preset number of the preliminarily bounded features 215. The preset number may be chosen to encompass the typical number of objects in a scene that are relevant for the computer 105 to track, e.g., 300. Alternatively, the subset may be one preliminarily bounded feature 215 for each feature.

Selecting the subset of the preliminarily bounded features 215 may include executing a convolutional neural network 250. The convolutional neural network 250 may include at least one hidden layer and an output layer. The hidden layer may include a bottleneck layer for reducing the number of preliminarily bounded features 215 under consideration. The output layer may project the preliminarily bounded features 215 to respective scores. The preset number of preliminarily bounded features 215 having the highest scores may be selected.

The convolutional neural network 250 may be trained with training data including images with ground-truth bounding boxes on the images. The output produced by the convolutional neural network 250 during training may be given a positive label, i.e., may be treated as a correct selection, when the output is within a top number of a ranking of most overlap with the ground-truth bounding boxes, e.g., the top five. The output produced by the convolutional neural network 250 during training may be given a negative label, i.e., may be treated as an incorrect selection, when the output is not within a top number of the ranking of most overlap with the ground-truth bounding boxes, e.g., the top ten. The ranking may have an intermediate set of positions that are not given a positive or a negative label, e.g., sixth through tenth. The scheme of matching the output to the ranking may be a static matching scheme; i.e., the scheme does not change over the course of the training. The matching scheme may be relative in that the positive and negative labels are assigned relative to the ranking. The use of a static relative scheme has been found to produce a faster convergence during training compared with, e.g., dynamic Hungarian matching. The positive and negative labels are used to calculate a selection loss that is minimized over the course of training. The selection loss may be, e.g., a sigmoid focal loss.

The second stage 240 is programmed to scale the selected preliminarily bounded features 255 to a uniform size, then apply a plurality of decoder transformer layers 260 to the selected preliminarily bounded features 255, and then determine the classifications 225 of the features of the selected preliminarily bounded features 255 and determine the predicted bounding boxes 230 for the selected preliminarily bounded features 255. Scaling the preliminarily bounded features 215 before determining the classifications 225 and the predicted bounding boxes 230 can ensure that the preliminarily bounded features 215 are properly fitted for the decoder transformer layers 260 and regression networks 285, 290 (described below). Applying the decoder transformer layers 260 to the preliminarily bounded features 215 before determining the classifications 225 and the predicted bounding boxes 230 can collect the relevant information regarding the features for the regression networks 285, 290.

The second stage 240 is programmed to scale the selected preliminarily bounded features 255 to the uniform size, i.e., to a same size regardless of the dimensions of the preliminary bounding boxes 210 of the selected preliminarily bounded features 255. For example, scaling each selected preliminarily bounded feature 255 to the uniform size may include selecting one of a plurality of transition networks 265 according to the pixel area and aspect ratio of the preliminary bounding box 210 of the preliminarily bounded feature 215 and applying the selected transition network 265 to the preliminarily bounded feature 215. The computer 105 can store one transition network 265 for each size of preliminary bounding box 210, e.g., nine transition networks 265 for the example of preliminary bounding boxes 210 above, permitting each size of preliminarily bounded feature 215 to be consistently treated by the rest of the second stage 240. Each transition network 265 may include a layer normalization step, a rectified linear unit activation function, and a linear projection layer, in that order.

The second stage 240 is programmed to apply the decoder transformer layers 260 to the selected preliminarily bounded features 255, as outputted by the transition networks 265. The decoder transformer layers 260 both decode and transform the data contained in the preliminarily bounded features 215. The second stage 240 can involve a fixed number L of decoder transformer layers 260, e.g., six. The number L can be chosen to balance fast convergence and processing time with accurate detection of the features. Each decoder transformer layer 260 may include (e.g., consist of) a cross-attention operation 270, a self-attention operation 275, and a feedforward operation 280, e.g., in that order. Each operation updates the features of the selected preliminarily bounded features 255, e.g., using skip connections.

Each decoder transformer layer 260 includes the cross-attention operation 270. For a given one of the selected preliminarily bounded features 255, the cross-attention operation 270 pools data about the features that neighbor the feature of the given one of the preliminarily bounded features 215 in the feature pyramid 205. The cross-attention operation 270 receives the preliminarily bounded features 215 and the feature pyramid 205 as input. The cross-attention operation 270 may be a multiscale deformable (MSDA) operation. For example, queries can be computed using the selected preliminarily bounded features 255, and responses to the queries can be computed from the feature pyramid 205. The queries specify where in the feature pyramid 205 to sample for the responses, which are then computed using an attention function. The cross-attention operation 270 may include a plurality of attention heads, e.g., eight, which define where to select sampling points for computing the response. The cross-attention operation 270 may include one sampling point per attention head and level (i.e., feature map) of the feature pyramid 205, e.g., forty sampling points for the examples above (eight attention heads times five feature maps in each feature pyramid 205). Using a single sampling point per attention head and level rather than multiple sampling points helps convergence while providing sufficient data. The cross-attention operation 270 may operate on the preliminarily bounded feature 215 by operating on the respective feature while receiving an encoding of the respective preliminary bounding box 210.

Each decoder transformer layer 260 includes the self-attention operation 275. For a given one of the selected preliminarily bounded features 255, the self-attention operation 275 interacts the given one of the selected preliminarily bounded features 255 with others of the selected preliminarily bounded features 255. The self-attention operation 275 may use a multihead attention operation. Queries, keys, and values for an attention function are mapped to different dimensions, and the attention function is then calculated in parallel. Multihead attention allows the self-attention operation 275 to jointly attend to information from different representation subspaces at different positions. The self-attention operation 275 can use a fixed number of heads operating in parallel, e.g., eight. The self-attention operation 275 may operate on the selected preliminarily bounded feature 255 by operating on the respective feature while receiving an encoding of the respective preliminary bounding box 210.

Each decoder transformer layer 260 includes a feedforward operation 280. The feedforward operation 280 may include a multilayer perceptron.

The second stage 240 is programmed to determine the classifications 225 of the features of the selected preliminarily bounded features 255. A classification 225 indicates a type of object that the feature is part of. Determining the classifications 225 includes selecting the classifications 225 from a plurality of prestored classifications. The prestored classifications may include a plurality of objects relevant for autonomously operating the vehicle 100, e.g., at least one vehicle classification indicating that the classified feature is from a (different) vehicle, at least one pedestrian classification indicating that the classified feature is from a pedestrian, etc. The prestored classifications may also include a nonobject classification indicating that the classified feature is not from an object. The nonobject classification is useful for identifying spuriously selected preliminarily bounded features 255.

For example, determining the classifications 225 may include executing a classification regression network 285. The classification regression network 285 may be a multilayer perceptron with at least one hidden layer, e.g., with one hidden layer. The classification regression network 285 may output scores for each prestored classification, including the nonobject classification. The classification 225 of the feature is the prestored classification given the highest score by the classification regression network 285.

The classification regression network 285 may be trained with training data including images with ground-truth bounding boxes and classifications on the images. The output produced by the classification regression network 285 during training may be given a positive label, i.e., may be treated as a correct classification 225, when the preliminary bounding box 210 of the outputted classification 225 is within a top number of a ranking of most overlap with the ground-truth bounding box of the same ground-truth classification, e.g., the top fifteen. The outputted classification 225 produced by the classification regression network 285 during training may be given a negative label, i.e., may be treated as an incorrect classification 225, when the output is within a top number of the ranking of most overlap with the ground-truth bounding box of a different ground-truth classification, e.g., the top fifteen. If a preliminary bounding box 210 is not in the top number, e.g., top fifteen, of any prestored classification, then it is treated as a nonobject. The scheme of matching the output to the ranking may be a static matching scheme; i.e., the scheme does not change over the course of the training. The matching scheme may be relative in that the positive and negative labels are relative to the ranking. The use of a static relative scheme has been found to produce a faster convergence during training compared with, e.g., dynamic Hungarian matching. The positive and negative labels are used to calculate a selection loss that is minimized over the course of training. The selection loss may be, e.g., a sigmoid focal loss. The training may not use (i.e., may forego) auxiliary decoder losses, i.e., losses after intermediate decoder layers, which have been found to not help the accuracy of the classification regression network 285.

The second stage 240 is programmed to determine the predicted bounding boxes 230 for the selected preliminarily bounded features 255. The predicted bounding box 230 is a prediction of circumscribing the feature of the selected preliminarily bounded feature 255. The predicted bounding box 230 for a given selected preliminarily bounded feature 255 may be encoded relative to the preliminary bounding box 210 of that selected preliminarily bounded feature 255, e.g., including a change in height, change in width, horizontal change of the center point, and/or vertical change in the center point.

For example, determining the predicted bounding boxes 230 may include executing a bounding-box regression network 290. The bounding-box regression network 290 may be a multilayer perceptron with at least one hidden layer, e.g., with one hidden layer.

The bounding-box regression network 290 may be trained with training data including images with ground-truth bounding boxes on the images. The output produced by the bounding-box regression network 290 during training may be given a positive label, i.e., may be treated as a correct selection, when the output is within a top number of a ranking of most overlap with the ground-truth bounding boxes, e.g., the top fifteen. The output produced by the bounding-box regression network 290 during training may be given a negative label, i.e., may be treated as an incorrect selection, when the output is not within a top number of the ranking of most overlap with the ground-truth bounding boxes, e.g., the top fifteen. The scheme of matching the output to the ranking may be a static matching scheme, i.e., does not change over the course of the training. The matching scheme may be relative in that the positive and negative labels are relative to the ranking. The use of a static relative scheme has been found to produce a faster convergence during training compared with, e.g., dynamic Hungarian matching. The training may use an L1 loss over the difference between the predicted bounding box 230 and the ground-truth bounding box. The training may not use (i.e., may forego) auxiliary decoder losses, i.e., losses after intermediate decoder layers, which have been found to not help the accuracy of the bounding-box regression network 290. The training may be performed in a single shot and not iteratively, which can make convergence faster without giving up accuracy.

Figure 3:
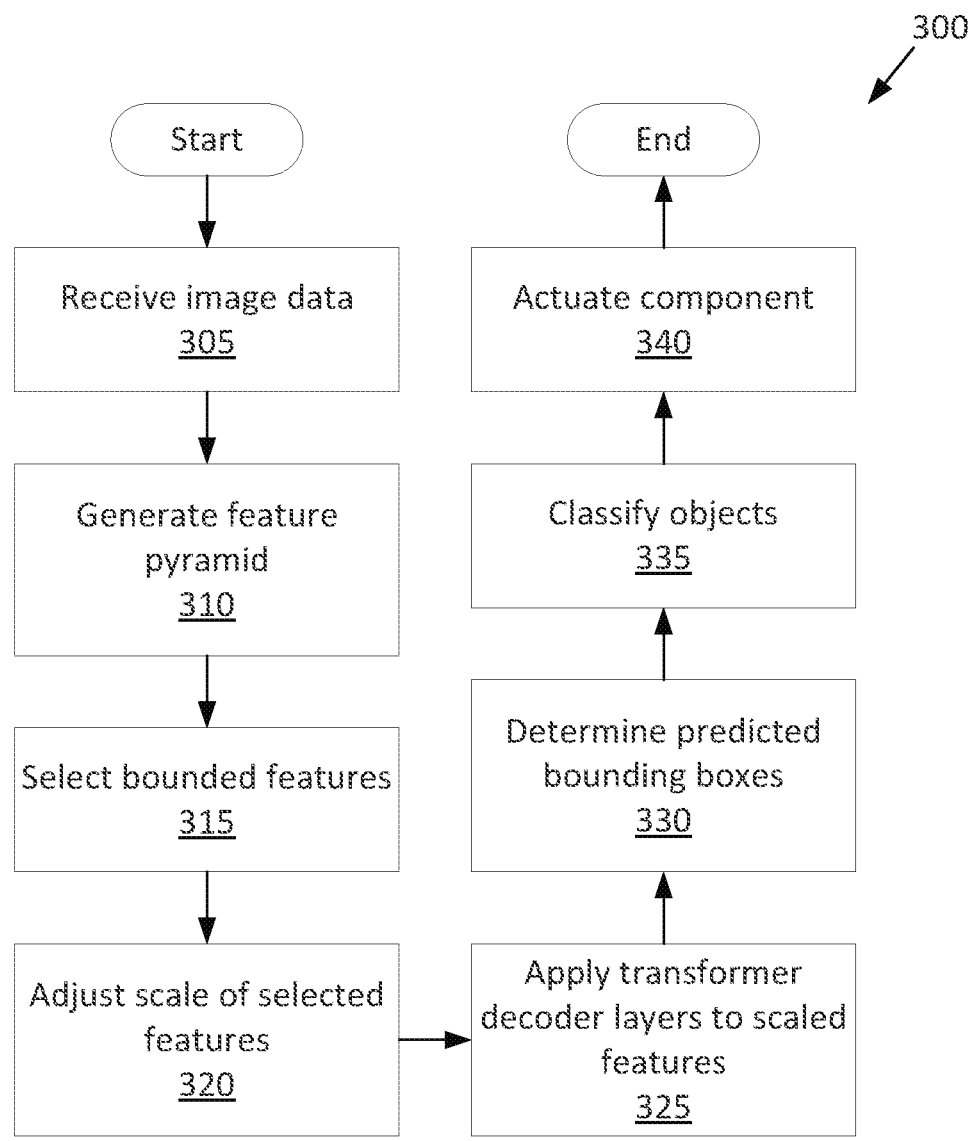
FIG. 3 is a process flow diagram of an example process for detecting the objects.

FIG. 3 is a process flow diagram illustrating an example process 300 for detecting objects. The memory of the computer 105 stores executable instructions for performing the steps of the process 300 and/or programming can be implemented in structures such as mentioned above. As a general overview of the process 300, the computer 105 receives image data 200, generates the feature pyramid 205, selects a subset of the preliminarily bounded features 215 from the feature pyramid 205, scales the selected preliminarily bounded features 255 to the uniform size, applies the decoder transformer layers 260 to the selected preliminarily bounded features 255, determines the predicted bounding boxes 230 for the selected preliminarily bounded features 255, determines the classifications 225 of the features of the selected preliminarily bounded features 255, and actuates a machine component of the vehicle 100 based on the classifications 225 and the predicted bounding boxes 230.

The process 300 begins in a block 305, in which the computer 105 receives the image data 200 from the sensor 110, e.g., the camera 130, as described above.

Next, in a block 310, the computer 105 generates the feature pyramid 205 from the image data 200 and applies the preliminary bounding boxes 210 to the features of the feature pyramid 205 to generate the preliminarily bounded features 215, as described above.

Next, in a block 315, the computer 105 selects the subset of the preliminarily bounded features 215, as described above with respect to the first stage 235 of the machine-learning program 220.

Next, in a block 320, the computer 105 scales the selected preliminarily bounded features 255 to the uniform size, as described above with respect to the second stage 240 of the machine-learning program 220.

Next, in a block 325, the computer 105 applies the decoder transformer layers 260 to the selected preliminarily bounded features 255, as described above with respect to the second stage 240 of the machine-learning program 220.

Next, in a block 330, the computer 105 determines the predicted bounding boxes 230 for the selected preliminarily bounded features 255, as described above with respect to the second stage 240 of the machine-learning program 220.

Next, in a block 335, the computer 105 determines the classifications 225 of the features of the selected preliminarily bounded features 255, as described above with respect to the second stage 240 of the machine-learning program 220.

Next, in a block 340, the computer 105 actuates the machine component of the vehicle 100 based on the classifications 225 and the predicted bounding boxes 230 (along with data from other sensors 110). The machine component can include, e.g., the propulsion system 115, the brake system 120, and/or the steering system 125. For example, the computer 105 can actuate at least one of the propulsion system 115, the brake system 120, or the steering system 125. For example, the computer 105 may actuate the brake system 120 based on the predicted bounding box 230 as part of an automatic-braking feature, e.g., braking to prevent the vehicle 100 from contacting one of the objects in the environment. The computer 105 can, if any of the predicted bounding boxes 230 have pixel locations corresponding to being in front of the vehicle 100 and the features are within a distance threshold of the vehicle 100 (which may be determined from other sensor 110 data), instruct the brake system 120 to actuate. The distance threshold can be chosen based on a stopping distance of the vehicle 100 and may vary with a speed of the vehicle 100. For another example, the computer 105 may operate the vehicle 100 autonomously, i.e., actuating the propulsion system 115, the brake system 120, and the steering system 125 based on the predicted bounding boxes 230 and the classifications 225, e.g., to navigate the vehicle 100 around the objects in the environment. Autonomously operating the vehicle 100 may be based on the classifications 225, e.g., in that the computer 105 may navigate the vehicle 100 to provide a larger buffer if the classification 225 is of an object that moves, e.g., motorcycle, than a type that is stationary, e.g., mailbox. After the block 340, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   receive image data from a sensor;
   generate a feature pyramid from the image data, the feature pyramid including a plurality of features;
   apply a plurality of preliminary bounding boxes to the features to generate a plurality of preliminarily bounded features, each preliminarily bounded feature being a pairing of one of the preliminary bounding boxes and one of the features;
   execute a machine-learning program on the preliminarily bounded features to determine a plurality of classifications and a respective plurality of predicted bounding boxes; and
   actuate a machine component based on the classifications and the predicted bounding boxes;
   wherein the machine-learning program is a two-stage object detector having a first stage and a second stage;
   the first stage is programmed to select a subset of the preliminarily bounded features;
   the second stage is programmed to determine the classifications of the features of the selected preliminarily bounded features and determine the predicted bounding boxes for the selected preliminarily bounded features;
   the second stage is further programmed to, before determining the classifications and the predicted bounding boxes, apply a plurality of decoder transformer layers to the selected preliminarily bounded features;
   each decoder transformer layer includes a cross-attention operation that, for a given one of the selected preliminarily bounded features, pools data about the features that neighbor the feature of the given one of the preliminarily bounded features in the feature pyramid; and
   the cross-attention operation is a multiscale deformable operation.

2. The computer of claim 1, wherein the machine component includes at least one of a propulsion system, a brake system, or a steering system of a vehicle.

3. The computer of claim 1, wherein the preliminary bounding boxes have a plurality of different pixel areas.

4. The computer of claim 1, wherein the preliminary bounding boxes have a plurality of aspect ratios.

5. The computer of claim 4, wherein
   the preliminary bounding boxes have a plurality of different pixel areas;
   the second stage is further programmed to scale the selected preliminarily bounded features to a uniform size; and
   scaling each selected preliminarily bounded feature to the uniform size includes selecting one of a plurality of transition networks according to the pixel area and aspect ratio of the preliminarily bounded feature and applying the selected transition network to the preliminarily bounded feature.

6. The computer of claim 1, wherein the second stage is further programmed to, before determining the classifications and the predicted bounding boxes, scale the selected preliminarily bounded features to a uniform size.

7. The computer of claim 1, wherein the cross-attention operation receives the feature pyramid as an input.

8. The computer of claim 1, wherein each decoder transformer layer includes a self-attention operation that, for a given one of the selected preliminarily bounded features, interacts the given one of the selected preliminarily bounded features with others of the selected preliminarily bounded features.

9. The computer of claim 1, wherein each decoder transformer layer includes a feedforward operation.

10. The computer of claim 1, wherein selecting the subset of the preliminarily bounded features includes executing a convolutional neural network including at least one hidden layer.

11. The computer of claim 10, wherein the hidden layer includes a bottleneck layer.

12. The computer of claim 1, wherein determining the classifications includes selecting the classifications from a plurality of prestored classifications.

13. The computer of claim 12, wherein the prestored classifications include a nonobject classification indicating that the classified feature is not from an object.

14. The computer of claim 12, wherein the prestored classifications include at least one vehicle classification indicating that the classified feature is from a vehicle and at least one pedestrian classification indicating that the classified feature is from a pedestrian.

15. The computer of claim 1, wherein determining the classifications includes executing a regression network.

16. The computer of claim 1, wherein determining the predicted bounding boxes includes executing a regression network.

17. A method comprising:
receiving image data from a sensor;
generating a feature pyramid from the image data, the feature pyramid including a plurality of features;
applying a plurality of preliminary bounding boxes to the features to generate a plurality of preliminarily bounded features, each preliminarily bounded feature being a pairing of one of the preliminary bounding boxes and one of the features;
executing a machine-learning program on the preliminarily bounded features to determine a plurality of classifications and a respective plurality of predicted bounding boxes; and
actuating a machine component based on the classifications and the predicted bounding boxes;
wherein the machine-learning program is a two-stage object detector having a first stage and a second stage;
the first stage is programmed to select a subset of the preliminarily bounded features;
the second stage is programmed to determine the classifications of the features of the selected preliminarily bounded features and determine the predicted bounding boxes for the selected preliminarily bounded features;
the second stage is further programmed to, before determining the classifications and the predicted bounding boxes, apply a plurality of decoder transformer layers to the selected preliminarily bounded features;
each decoder transformer layer includes a cross-attention operation that, for a given one of the selected preliminarily bounded features, pools data about the features that neighbor the feature of the given one of the preliminarily bounded features in the feature pyramid; and
the cross-attention operation is a multiscale deformable operation.

* * * * *